US 9,849,774 B2

(12) United States Patent
Hutchins (10) Patent No.: US 9,849,774 B2
(45) Date of Patent: Dec. 26, 2017

(54) RADIATOR SUPPORT STRUCTURE AND METHOD (71) Applicant: Jaguar Land Rover Limited, Whitley, Coventry, Warwickshire (GB)

(72) Inventor: William Hutchins, Kenilworth (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 145 days.

(21) Appl. No.: 14/431,267

(22) PCT Filed: Sep. 24, 2013

(86) PCT No.: PCT/EP2013/069875
§ 371 (c)(1),
(2) Date: Mar. 25, 2015

(87) PCT Pub. No.: WO2014/048931
PCT Pub. Date: Apr. 3, 2014

(65) Prior Publication Data
US 2015/0231961 A1    Aug. 20, 2015

(30) Foreign Application Priority Data

Sep. 26, 2012  (GB) .................................. 1217218.5
Sep. 26, 2012  (GB) .................................. 1217219.3

(51) Int. Cl.
*B60K 11/04*    (2006.01)
*F16B 2/22*    (2006.01)

(52) U.S. Cl.
CPC .............. *B60K 11/04* (2013.01); *F16B 2/22* (2013.01); *Y10T 29/49863* (2015.01)

(58) Field of Classification Search
CPC .................................. B60K 11/04; F16B 2/22
See application file for complete search history.

(56) References Cited

U.S. PATENT DOCUMENTS 5,605,200 A    2/1997   Mayberry et al.
6,668,955 B1   12/2003  Kosakowski et al.
(Continued)

FOREIGN PATENT DOCUMENTS

DE    1211501 B    2/1966
DE    4028250 C1   10/1991
DE    4137038 C1   6/1993
(Continued)

OTHER PUBLICATIONS

GB Combined Search and Examination Report for corresponding application No. 1217218.5, dated Jan. 22, 2013, 10 pages.
(Continued)

*Primary Examiner* — John Walters
*Assistant Examiner* — James Triggs
(74) *Attorney, Agent, or Firm* — Reising Ethington P.C.

(57) ABSTRACT

A mount for supporting a motor vehicle radiator in a substantially upright, transverse orientation. The mount includes a resiliently flexible pair of opposed grip members that grip a support portion of the radiator. The mount is configured such that, when the support portion of the radiator is placed between the grip members and the support portion is urged against the mount, the grip members exert a gripping force on the support portion to retain the support portion therebetween.

19 Claims, 8 Drawing Sheets (56) References Cited

U.S. PATENT DOCUMENTS 6,668,956 B1 * 12/2003 Pelage .................. B60K 11/04
                                                    180/312
8,826,538 B2 * 9/2014 Itoh ....................... B60K 11/04
                                                    180/68.4

FOREIGN PATENT DOCUMENTS

| DE | 19744173 A1 | 4/1999 |
|----|-------------|--------|
| EP | 0270312 A2 | 11/1987 |
| EP | 0932010 A2 | 7/1999 |
| EP | 1106413 A2 | 6/2001 |
| EP | 1342604 A1 | 9/2003 |
| GB | 1309354 | 4/1971 |
| JP | 2002286392 A | 10/2002 |
| JP | 2005035435 A | 2/2005 |
| JP | 2010032085 A | 2/2010 |
| WO | 2006074894 A1 | 7/2006 |
| WO | 2011015746 A1 | 2/2011 |
| WO | 2011098381 A1 | 8/2011 |

OTHER PUBLICATIONS

International Search Report for application No. PCT/EP2013/069875, dated Jun. 16, 2014, 6 pages.
Written Opinion for application No. PCT/EP2013/069875, dated Jun. 16, 2014, 18 pages.
Japanese Office action in Japanese with English summary, dated Mar. 1, 2016, 10 pages.

* cited by examiner

PRIOR ART

RADIATOR SUPPORT STRUCTURE AND METHOD

TECHNICAL FIELD

The present invention relates to support structures. In particular but not exclusively the invention relates to support structures for supporting a radiator for cooling engine coolant. Aspects of the invention relate to a mount, to a vehicle, to a structure and to a method.

BACKGROUND

It is known to provide a radiator for cooling engine coolant. In some radiators coolant is passed through an array of parallel thin-walled tubes which may be arranged horizontally or vertically. Radiator support posts may be provided at opposite ends of the radiator which are attached to a chassis or lower structural support member of the vehicle. The support posts may bear a substantial portion of the weight of the radiator and therefore be subject to relatively high forces.

It is desirable to provide an improved arrangement for supporting a radiator in a motor vehicle.

SUMMARY OF THE INVENTION

Embodiments of the invention may be understood with reference to the appended claims.

Aspects of the present invention provide a mount a structure, a vehicle and a method.

In one aspect of the invention for which protection is sought there is provided a mount for supporting a motor vehicle radiator, the mount comprising resiliently flexible coupling means for coupling the mount to a support portion of the radiator, the coupling means comprising a pair of opposed grip members for gripping the support portion, the mount being configured wherein when the support portion of the radiator is placed between the grip members and the support portion is urged against the mount, the grip members exert a gripping force on the support portion to retain the support portion therebetween.

Embodiments of the invention have the advantage that an ease of assembly of a motor vehicle radiator structure may foe increased. This is because the radiator may be coupled to a radiator mount by simply inserting a support portion of the radiator between grip members of the mount and urging the radiator towards the mount in the case of a mount located below the radiator support portion, the mount and support portion may be arranged wherein a weight of the radiator on the support portion is able to generate sufficient gripping force on the support portion.

Advantageously the mount may comprise a pair of support leg portions, the support leg portions being arranged to urge the grip members towards one another when the support portion is urged against the mount.

The leg portions may define two sides of a substantially triangular arrangement or structure, optionally a truncated triangular arrangement. The structure may be a virtual structure, for example a structure not having a basal side connecting ends of the leg portions. An apex defined by the arrangement may be arranged to be above the mount with the mount resting on the leg portions on a substantially horizontal surface.

Further advantageously a first slot may be provided between the pair of support leg portions to receive a corresponding first member of the radiator support portion.

The mount may comprise two pairs of leg portions arranged in a box formation.

The mount may comprise a second slot between respective pairs of leg portions for receiving a corresponding second member of the radiator support portion.

Advantageously the first and second slots may be substantially orthogonal to one another.

Other arrangements are also useful.

The mount may comprise a cap portion having a substantially X-shaped cavity defining the first and second slots.

A length of one or both of the first and second slots may be tapered in a direction along that in which the mount is arranged to allow the radiator support portion to be introduced therein.

Both the first and second slots may be tapered, optionally towards a common apex.

The mount may be formed from a moulded elastomeric material.

In a further aspect of the invention for which protection is sought there is provided a motor vehicle body structure comprising a radiator mount support platform arranged to support a mount according to the preceding aspect.

The structure may comprise a pair of radiator mount support platforms each supporting a respective mount; and a radiator having a pair of radiator support portions, wherein each of the radiator support portions is gripped by a corresponding mount whereby the radiator is supported by the vehicle body structure.

The pair of radiator support portions may each comprise first and second orthogonal members shaped in a complementary manner to the first and second slots of the mount.

Advantageously the support portions may hays a substantially X-shaped cross section, the first and second portions being tapered parallel to a direction in which the support portions are arranged to be introduced into the mount, optionally tapered toward a common apex.

In some embodiments the support portion may be substantially in the shape of an arrowhead.

The first and second members may comprise substantially triangular plate elements having a common base.

The radiator may comprise first and second respective different support portions each arranged to be gripped by respective substantially identical mounts.

The first and second slots may be arranged substantially parallel to lateral and longitudinal axes of the vehicle, respectively, and the first support portion may be shaped to fit snugly within the cap portion of a mount and to be gripped thereby at substantially only one position with respect to the longitudinal and lateral axes of the vehicle.

The second support portion may be shaped wherein the support portion may fit within the cap portion of a mount and be gripped thereby at a range of positions with respect to the lateral axis of the vehicle.

This feature has the advantage that differences in the spacing of the radiator support portions from one radiator to another may be accommodated.

In some alternative embodiments both the first and second support portions may be arranged to fit within the cap portion of a mount and be gripped thereby at a range of positions with respect to the lateral axis of the vehicle.

Advantageously the second support portion may be arranged wherein a thickness of the second member thereof is less than a corresponding width of the second slot of the mount in which it is provided, and a lateral extent of the first member parallel to the lateral axis is less than a corresponding lateral extent of the first slot of the mount in which it is provided.

In an aspect of the invention for which protection is sought there is provided a method of supporting a motor vehicle radiator, the method comprising coupling a support portion of the radiator to a mount comprising resiliency flexible coupling means, whereby when the radiator is placed between a pair of opposed grip members of the coupling means and the support portion is urged against the mount, the grip members exert a gripping force on the support portion to retain the support portion therebetween.

In a further aspect of the invention for which protection is sought there is provided a method of assembly of a radiator support structure comprising providing a pair of mounts according to a preceding aspect; and coupling each one of a pair of radiator support portions of a radiator to a respective one of the mounts.

The method may comprise providing the pair of mounts on support portions of a motor vehicle structure.

In one aspect of the invention for which protection is sought there is provided a mount for supporting a motor vehicle radiator comprising: coupling means for coupling the mount to a support portion of the radiator; and a first pair of support leg portions for supporting the mount on a surface, first and second support leg portions of the first pair being arranged to define two sides of a triangular structure, the mount being arranged wherein an apex defined by the leg portions is spaced apart from the surface by the leg portions.

According to another aspect of the invention there is provided a mount for supporting a motor vehicle radiator comprising: coupling means for coupling the mount to a support portion of the radiator; and a first pair of support leg portions for supporting the mount on a surface, first and second support leg portions of the first pair being arranged to define two sides of a triangular structure having an apex, the mount being arranged such that, in use, forces acting on the radiator along lateral or longitudinal axes of a vehicle are transmitted through the support leg portions and act through an instantaneous centre at the apex.

It is to be understood that the mount may be arranged wherein forces acting on the radiator may be transmitted through the support leg portions and act through an instantaneous centre at the apex.

That is, the apex may be considered to define an instantaneous centre through which the forces act.

Embodiments of the present invention have the advantage that a position through which reaction forces exerted on the radiator by a support structure act may be controlled in such a manner that a magnitude of a moment experienced at a given location of the radiator may be reduced. The mount may be arranged such that the instantaneous centre is located at a position at which it is otherwise physically impossible to apply a reaction force, for example at a location that is outside of the mount, and may be within another component such as a location within the radiator itself. It is to be understood that radiators are typically relatively fragile components, having thin-walled coolant conduits for effecting heat exchange with the environment. In some radiators, upper and lower (top and bottom) coolant reservoirs are connected by thin-walled vertical tubes which effect the heat exchange. The tubes may be joined to upper and lower manifolds to support the tubes, for example by welding. The joint between the tubes and manifold may be fragile, and a risk exists that if a sufficiently large moment is applied to the joint, the joint may fail. In contrast, the joints may be relatively strong if shear forces are applied thereto.

The support leg portions may define a substantially inverted-V shaped structure or A-frame like structure if the mount is stood on a horizontal plane, for example in an orientation so as to support a weight of a radiator, optionally from below the radiator.

It is to be understood that the mount may support the radiator from below or from above. In the case the radiator is supported from below, the mount may bear at least a portion of a weight of the radiator. In the case the mount supports a radiator from above, the mount may be placed in an inverted orientation against a surface above the mount. In such an application whilst the mount may not bear a weight of the radiator, the mount may still communicate forces on the radiator to a body structure of the vehicle.

The mount may be arranged to be positioned with the first and second leg portions projecting downwardly in respective forward and rearward directions relative to a longitudinal axis of the vehicle to support a radiator on a portion of a vehicle body structure. The radiator may be mounted transverse to the vehicle body structure, i.e. in a lateral or east-west orientation although other orientations are also useful. Thus, forces acting on the radiator in forward or rearward directions may be arranged to act through an instantaneous centre at the apex defined by the first and second leg portions.

Advantageously the support leg portions may define two sides of a truncated triangular structure having a virtual apex.

The first and second leg portions may be of substantially the same length. The triangular structure may be substantially symmetrical about a vertical axis with the mount on a substantially horizontal surface resting on the leg portions.

Further advantageously the virtual apex may be arranged in use to be located within the radiator.

Thus the structure may be arranged such that the apex of the virtual triangular structure defined by the leg portions is actually located within the radiator. It is to be understood that the mount is not able to apply a reaction force at a location that is directly inside the radiator, for example within the support portion or within a lower or upper coolant tank of the radiator. Embodiments of the present invention overcome this problem by establishing an instantaneous centre through which the reaction forces established within the leg portions act. The instantaneous centre may be located within the radiator itself, and may for example be located within a coolant tank of the radiator.

The mount may be provided with a first slot between the first and second support log portions arranged to receive a first member of the support portion of the radiator, the mount being configured to grip the first member of the support portion between the first and second leg portions.

Advantageously the mount may be configured to apply a gripping force to the first member of the support portion the magnitude of the gripping force being dependent at least in part on the magnitude of a force urging the first member into the first slot.

This feature has the advantage that in some embodiments the gripping force applied by the mount to the first member may increase as the force urging the first member into the slot increases.

Further advantageously the coupling means may comprise a resiliently deformable material arranged to deform and thereby exert a gripping force on the first member when the first member is urged into the first slot.

In some arrangements the resiliently deformable material is arranged to expand by stretching in one direction when a radiator support portion is introduced therein in such a manner as to exert a gripping force on the radiator support portion in a substantially orthogonal direction to that of its expansion. For example, as the material is stretched due to pressure applied thereto by the radiator support portion, the material coupling means may contact around at least a portion of the radiator support portion thereby to exert a gripping force thereon.

Thus in some arrangements the coupling means may tend to contract in one direction around the radiator support portion when stretched in another direction, for example when a weight of the radiator is born by the mount via the radiator support portion.

The coupling means may be arranged to expand in one direction when subject to a compressive force in an orthogonal direction to that of the direction of the compressive force. The compressive force may for example be due to a weight of the radiator on the radiator support portion in embodiments in which the mount supports the radiator from below. This force may cause expansion of the material by the Poisson effect in such a direction as to grip the support portion and fix the position of the support portion with respect to the mount.

Advantageously the mount may comprise a second pair of leg portions arranged wherein the first leg portion of the first pair is substantially parallel to a first leg portion of the second pair and the second leg portion of the first pair is substantially parallel to a second leg portion of the second pair.

In some alternative embodiments the second pair may be arranged to be substantially orthogonal to the first pair.

Further advantageously a second slot may be provided between the (substantially parallel) first leg portions of the first and second pair and between the (substantially parallel) second leg portions of the first and second pair arranged to receive a second member of the radiator support portion therein, wherein when the second member of the radiator support portion is pressed into the mount the first leg portions are arranged to grip the second member therebetween and the second leg portions are arranged to grip the second member therebetween.

Advantageously the first and second members of the support portion may be in the form of substantially orthogonal plate elements, optionally the plate elements tapering toward a common apex.

In some embodiments the radiator support portion may be substantially in the shape of an arrowhead.

The first and second members may be in the form of substantially triangular plate elements having a common base.

The mount may comprise a cap portion arranged to receive the radiator support portion, the cap portion having a shape corresponding to that of the support portion.

The cap portion, may be arranged wherein the radiator support portion is received snugly therein whereby the cap portion may grip firmly the radiator support portion when the support portion is pressed into the mount.

The cap portion of the mount may define the first and second slots for receiving the first and second members of the radiator support portion.

In a further aspect of the invention for which protection is sought there is provided a motor vehicle body structure comprising a radiator mount support platform arranged to support a mount according to the preceding aspect.

Advantageously the support platform may comprise at least one pair of bump-stop elements arranged to abut an outer surface of the cap portion on opposite sides of the mount in the event the cap portion is displaced a sufficient distance towards one of the bump-stop elements.

The bump-stop elements may have a surface in opposition to the cap portion that is inclined with respect to a plane containing lateral and longitudinal axes of the vehicle thereby to direct a reaction force between a bump-step element and the cap portion into the radiator support portion such that the reaction force has components that are parallel and perpendicular to a z-axis of the vehicle being an axis normal to the plane containing the lateral and longitudinal axes of the vehicle.

Figure 1:
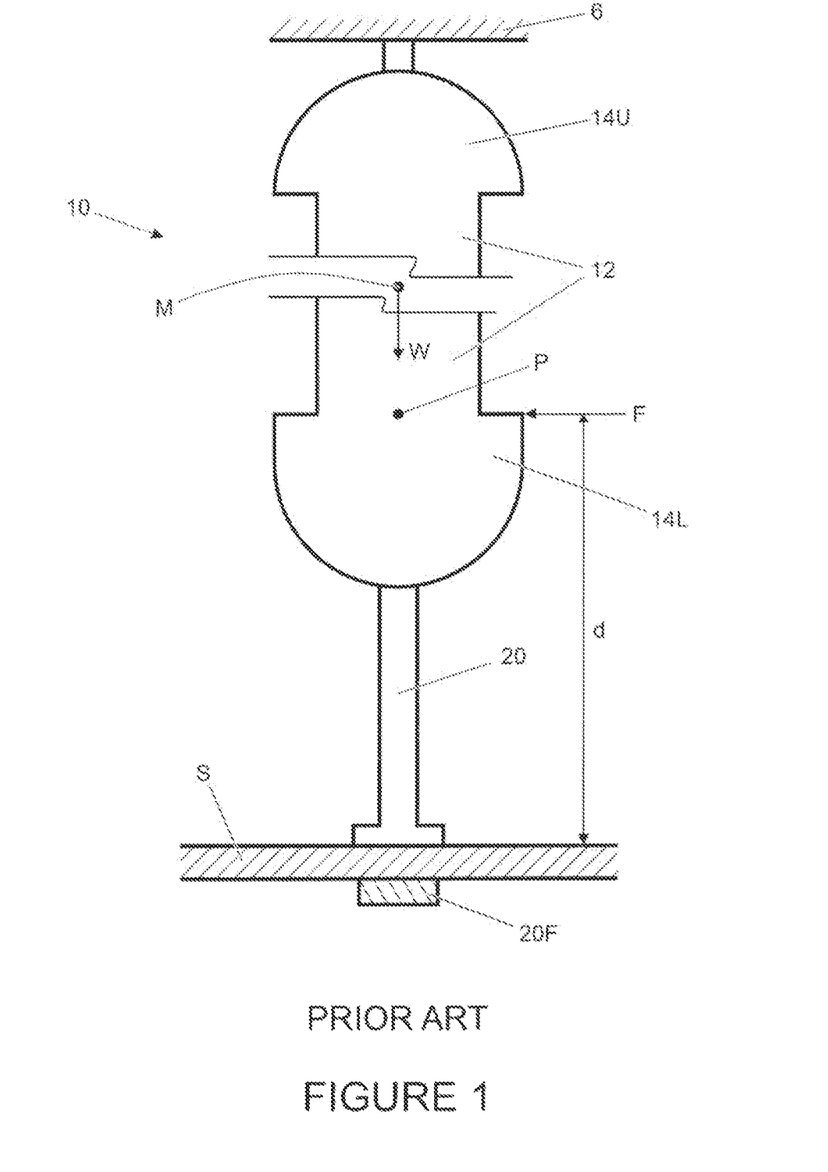
FIG. 1 is a schematic illustration of a portion of a known radiator support arrangement.

This feature has the advantage that the reaction force may be arranged to act on the radiator in such a direction that a magnitude of a bending moment exerted on the radiator by the reaction force may be reduced relative to the known arrangement of FIG. 1.

The structure may be provided in combination with a radiator.

The radiator may be arranged in a transverse orientation parallel to a lateral axis of the vehicle. In embodiments having the first and second orthogonal slots, the first slot may be oriented parallel to a lateral vehicle axis and the second slot parallel to a longitudinal vehicle axis.

The radiator may have first and second respective different support portions each arranged to be gripped by respective substantially identical mounts.

The first support portion may be shaped to fit snugly within the cap portion of a mount and to be gripped thereby at substantially only one position with respect to longitudinal and lateral axes of the vehicle.

The second support portion may be shaped wherein the supped element may fit within the cap portion of a mount and be gripped thereby at a range of positions with respect to the lateral axis of the vehicle.

The second support portion may be arranged wherein a width of a second member thereof is less than a corresponding width of the second slot of the mount and a lateral extent of the first member thereof is less than a corresponding lateral extent of the first slot of the mount thereby to accommodate a variation in distance between the first and second radiator support portions with respect to a lateral axis of the vehicle.

In one aspect of the invention there is provided a method of supporting a radiator of a motor vehicle comprising transmitting forces acting on the radiator to a body structure of the vehicle by means of a mount, whereby forces acting on the radiator along lateral or longitudinal axes of the vehicle are transmitted through support leg portions of the mount defining a substantially triangular structure and act through an instantaneous centre at an apex thereof, the apex being spaced apart from the vehicle body structure by the leg portions.

In a further aspect of the invention there is provided a method of assembly of a radiator support structure comprising providing a pair of mounts according to a preceding aspect and coupling each one of a pair of radiator support portions of a radiator to a respective one of the mounts.

The method may comprise providing the pair of mounts on support portions of a motor vehicle structure.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF THE DRAWINGS

One or more embodiments of the invention will now be described, by way of example only, with reference to the accompanying figures in which.

DETAILED DESCRIPTION

FIG. 1 shows a known radiator support arrangement by means of which a radiator 10 of substantially rectangular shape may be supported in a transverse orientation at a front of a motor vehicle. The radiator 10 has upper and lower coolant tanks 14U, 14L in fluid communication with one another via an array of vertically disposed radiator tubes 12. Hot coolant entering the upper coolant tank 14U is arranged to flow down through the tubes 12 to the lower coolant tank 14L, the coolant being cooled as it flows.

The radiator 10 is of weight W, the weight acting through a centre of mass M of the radiator 10. The weight W of the radiator may be up to 30 kg or more in some vehicles.

The radiator 10 is supported at a lower end thereof by a support post 20 that is connected at an upper end to the lower coolant tank housing and at a lower end to a structural member 5 of the vehicle. The structural member 5 may for example form part of a chassis of a vehicle in some embodiments. In the embodiment shown the support post 20 is connected to the structural member 5 by means of a screw fixing element 20F inserted into the post 20 from below. In some embodiments the post 20 is surrounded by a tubular rubber bush that extends from the housing of the lower coolant tank 14L to the structural member 5.

The radiator 10 is supported at an upper end thereof by a further structural member 6 so as to prevent forward, backward or side to side movement of the radiator 10. In some known arrangements vertical movement of the radiator 10 within prescribed limits is not constrained by the coupling to the structural member 6.

In FIG. 1 a force F is shown acting on the radiator 10 in a rearward direction parallel to a longitudinal axis of the vehicle, normal to the transverse plane of the radiator 10. The force F is applied at a position where the radiator tubes 12 are joined to the lower coolant tank 14L. This joint is typically capable of withstanding substantial shear forces. However the joint is relatively weak when subject to a bending moment. The force F applied to the radiator 10 causes reaction forces to be generated at the structural members 5, 6. This results in a bending moment being applied to the radiator 10 at the point of application of the force F.

The moment includes a component due to the force reacted at the support member 5 multiplied by the distance d between the line of application of force F and the support member 5. This moment can be not inconsiderable, since distance d may be of the order of 50 mm or more. It is desirable to increase the magnitude of the force F that the radiator may withstand when the vehicle is in service.

Figure 2:
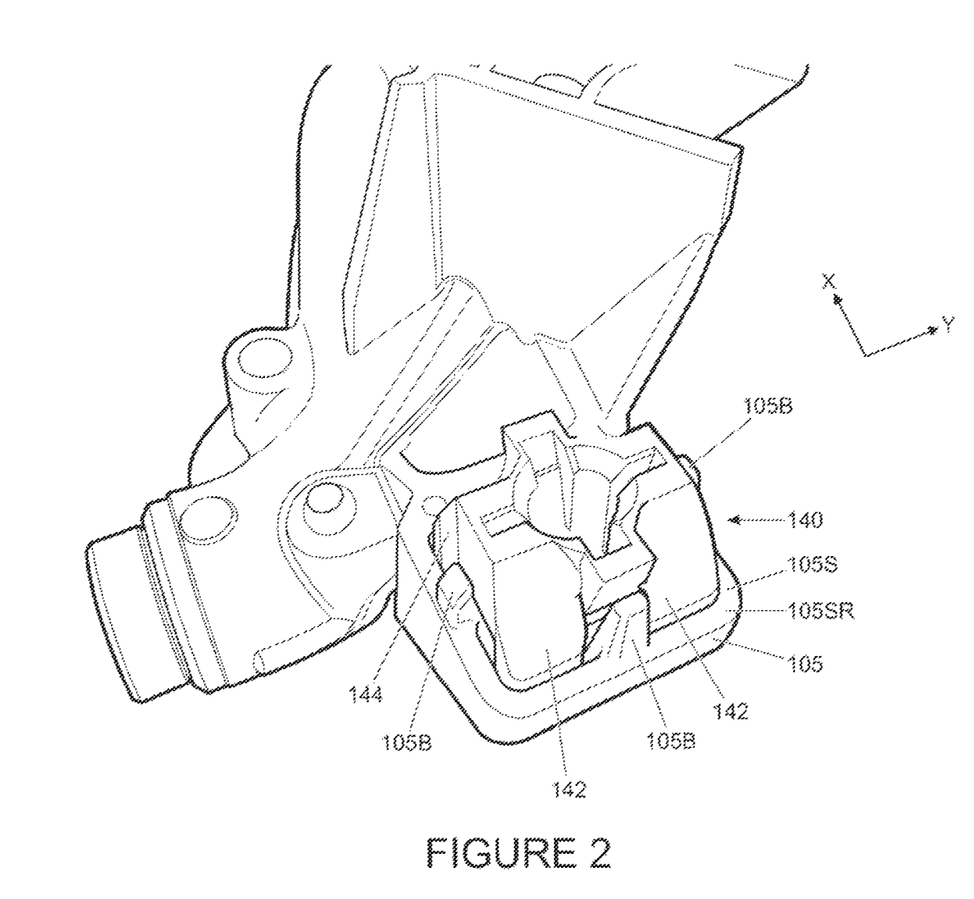
FIG. 2 is a schematic illustration of a mount portion of a radiator support arrangement according to an embodiment of the present invention installed on a support provided by a portion of a vehicle chassis.

FIG. 2 is a perspective view of a radiator mount 140 according to an embodiment of the present invention. The mount 140 has been conceived by the applicant as a means for managing the location at which bending moments are experienced by the radiator 10 in response to longitudinal forces to which the radiator 10 is subject.

Figure 3:
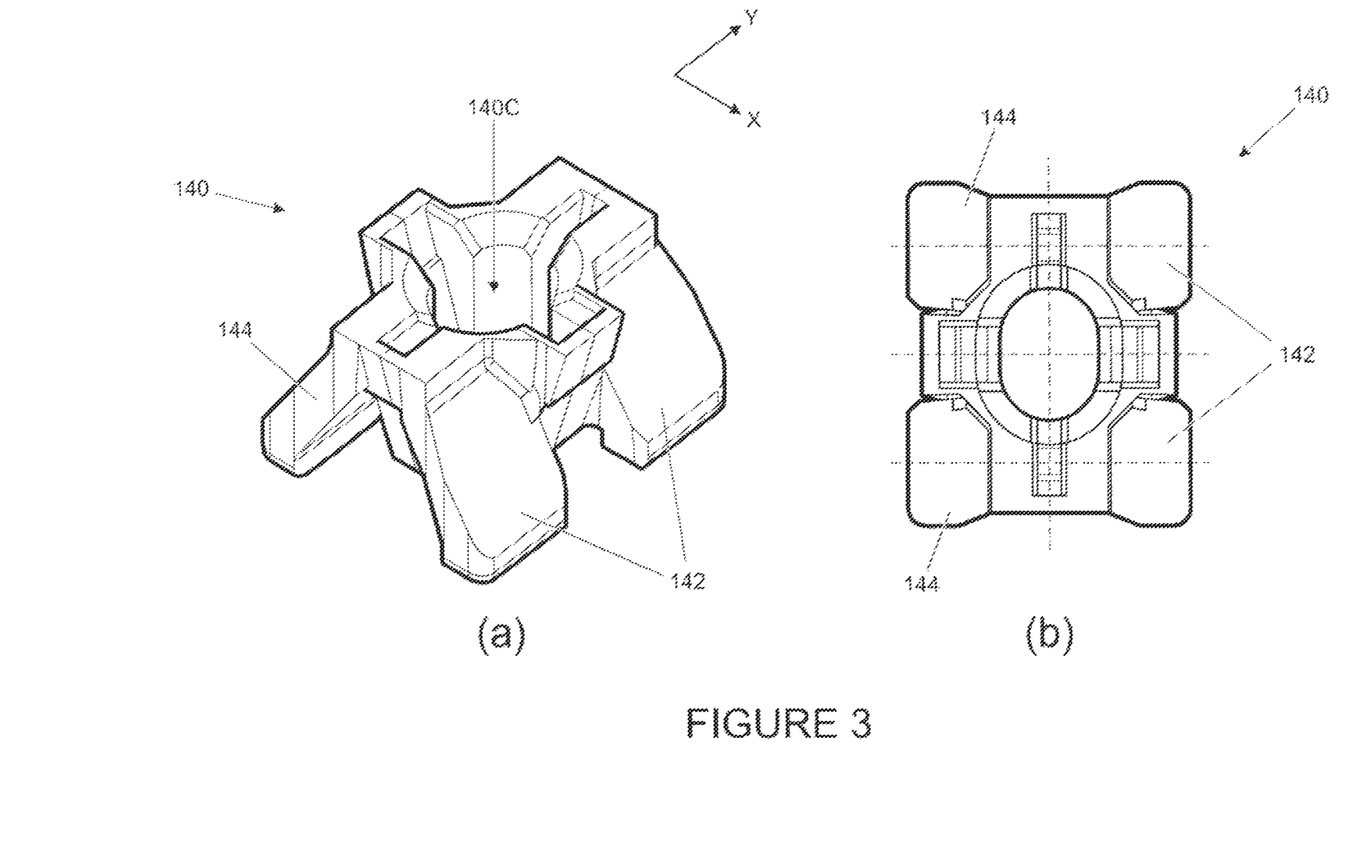
FIG. 3 shows the mount portion of FIG. 2 in (a) perspective view and (b) as viewed from an underside of the mount.
Figure 4:
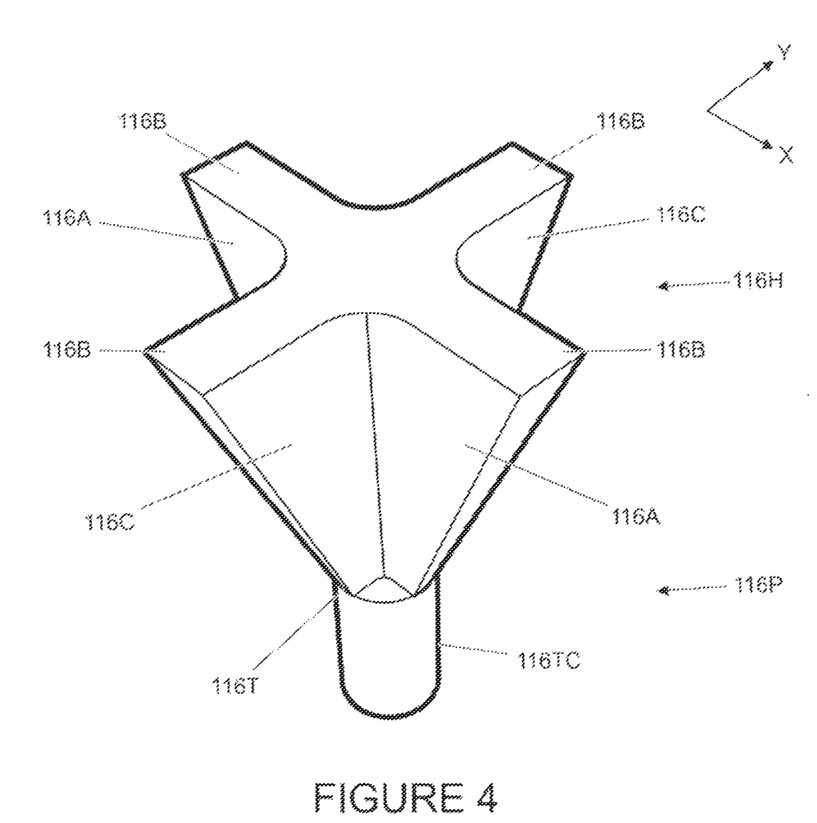
FIG. 4 shows a support post of a radiator that is adapted to be supported by the mount of FIG. 2.
Figure 5:
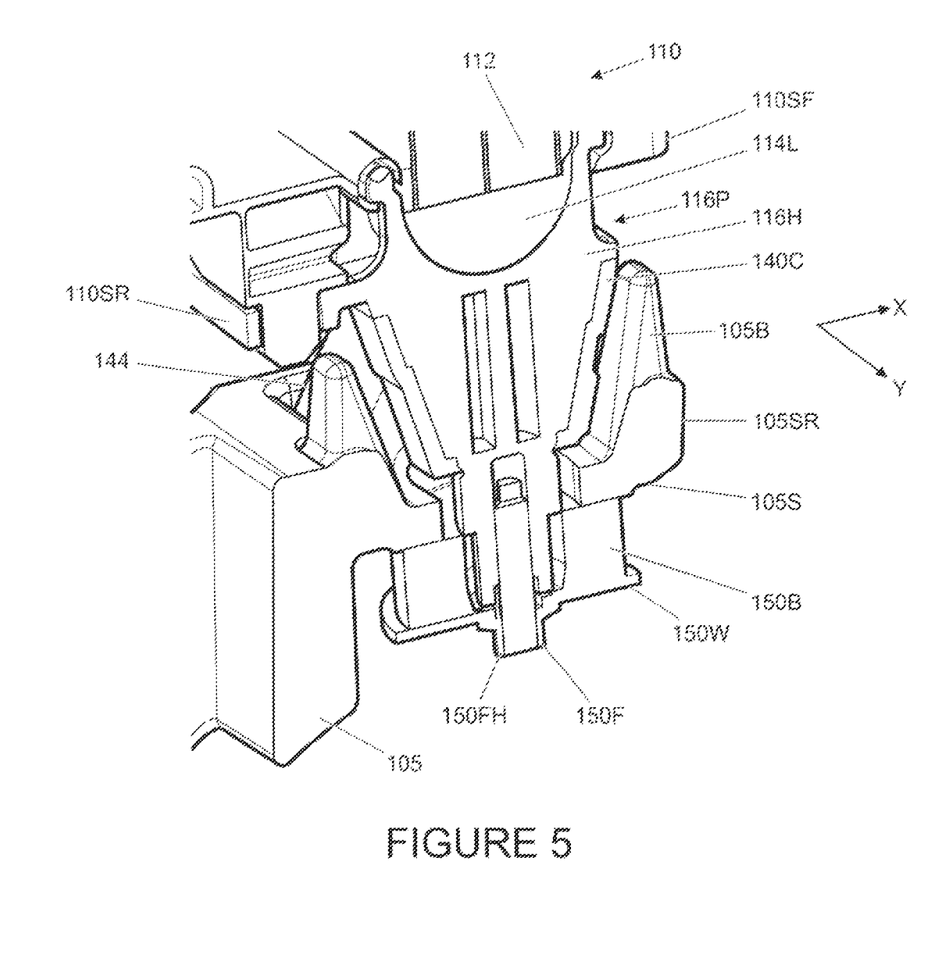
FIG. 5 shows a cutaway view of the radiator support post in its installed location supported by the mount of FIG. 2.

The mount 140 is in the form of a moulded rubber element arranged to receive a support post 116P of a radiator 110 (FIG. 4, FIG. 5). The mount is shown in FIG. 2 and FIG. 5 located on a mount support platform 105S provided by a portion of a vehicle chassis 105. The mount 140 is shown alone in perspective view in FIG. 3(a). FIG. 3(b) shows the mount 140 as viewed from below.

The mount 140 has two pairs of legs that rest on the support platform 105S, one at each of two opposite ends thereof, each pair having a leg 142 projecting in a downward, forward direction and a leg 144 projecting in a downward, rearward direction. The legs 142, 144 are provided at each of four corners of the mount 140.

It is to be understood that reference herein to directions such as forward, downward and rearward are with respect to a normal upright orientation of a vehicle in which the mount 140 is provided in service.

The legs 142, 144 are disposed around a cap portion 140O of the mount 140. The cap portion 140C defines a cavity shaped to receive a head portion 116H of a radiator support post 116P such as that illustrated schematically in FIG. 4. The head portion 116H is of substantially X-shaped cross-section and tapers to a tip 116T. The head portion 116H may be considered to comprise a pair of orthogonal, triangular blades 116A, 116B sharing a common apex 116T and having bases 116P in a common plane (being a substantially horizontal plane in the orientation shown, being that assumed when the vehicle is on a substantially flat surface). The post 116P has a cylindrical portion 116TC protruding from tip 116T in a downward direction. The cylindrical portion 116TC has a tapped bore arranged to receive a fixing element 150F in the form of a bolt as described in more detail below with respect to FIG. 5.

The cap portion 140C is of complimentary shape to the head portion 116H and is arranged snugly to grip the head portion 116H when the head portion is inserted therein, with substantially no gaps between the blades 116A, 116C and mount 140.

In the embodiment shown, the mount 140 is arranged wherein when the head portion 116H is lowered into the cap portion 140C the elastomeric material of which the mount 140 is formed is compressed. Compression of the material in a vertical direction causes expansion in a lateral direction (due to the Poisson effect) causing the mount 140 snugly to grip the blades 116A, 116B of the head portion 116H. Blade 116A may be referred to as a longitudinal blade since in the installed position it is oriented in a longitudinal direction parallel to a length of the vehicle (i.e. parallel to the X-axis). This may also be referred to as a 'north-south' orientation. Blade 116C may be referred to as a lateral blade since in the installed position it is oriented in a lateral direction across a width of the vehicle (parallel to the Y axis). This may also be referred to as an 'east-west' orientation.

It is to be understood than one pair of forward and rearward projecting leg portions 142, 144 on one side of blade 116A are arranged to grip therebetween a corresponding portion of blade 116C on one side of the bead portion 116H whilst the pair of forward and rearward projecting leg portions 142, 144 on the opposite side of blade 116A are arranged to grip therebetween a corresponding remaining portion of blade 116C on that opposite side of the head portion 116H.

Similarly, the two forward projecting leg portions 142 grip a corresponding forward portion of blade 116A therebetween whilst the two rearward projecting leg portions 142 grip a remaining corresponding rearward portion of blade 116A therebetween.

The leg portions 142, 144 of the mount 140 are arranged to sit snugly within a four-sided rectangular tray defined by a rectangular rim portion 105SR of the support platform 105S. Lateral movement of the mount 140 is constrained by the dm portion 105SR, which retains the mount 140 on the support platform 105S.

It can be seen that blade 116A has a thickness greater than that of blade 116C. The thickness of each blade corresponds to the width of the corresponding region of the cavity defined by the cap portion 140C.

At midpoints of each of the four sides of the rim portion 105SR bump-stop elements 105B are provided. The bump stop elements 105B are in the form of formations that project upwardly from the rim portion 105SR. A face of each bump stop in opposition to the mount 140 is arranged to face a corresponding outer surface of cap portion 140C at a location corresponding to an outer edge of each of the blades 116A, 116C. The bump-stop elements 105B are arranged such that if the head portion 116H of the support post 116P moves downwardly by a sufficient distance from a rest position (being a position assumed with the vehicle substantially stationary) the cap portion 140C contacts the bump-stop elements 105B and further movement of the head portion 116H is restrained. In the present embodiment the distance is arranged to be substantially 3 mm although other distances are also useful. The thickness of the cap portion 140C around the edges of the blade portions where contact is made with the bump-stop elements 105B is also around 3 mm in the present embodiment. Other thicknesses are also useful.

It is to be understood that, in the event the head portion 116H does move vertically downwards, the leg portions 144, 142 become compressed, opposing further movement of the head portion 116H, until the mount 140 contacts the bump-stop elements.

Similarly, in the event the head portion 116H moves in a forward or rearward direction, forward or rearward projecting leg portions 142, 144 compress, opposing further movement of the head portion 116H, until a corresponding surface of the cap portion 140C around a forward projecting or rearward projecting edge of blade 116A abuts the corresponding bump-stop element 105B.

The bump-slop elements 105B are arranged such that a face of each bump stop element 105B facing the cap portion 140C is substantially parallel to the outer surface of the cap portion 140C which is in turn substantially parallel to the corresponding tapering edge of the blade 116A. As such, a reaction force exerted by the bump-stop 105B on the head portion 116H has a component directed upwardly as well as a component directed horizontally into the head portion 116H. In the embodiment illustrated, the reaction force is arranged to pass along a vector that passes through an interior of the radiator 110. It is to be understood that this arrangement reduces the bending moment experienced by the radiator structure compared with the prior art arrangement of FIG. 1. This is advantageous because the chassis is relatively stiff and strong, whilst the radiator 110 is relatively fragile.

FIG. 5 is a cut-away diagram showing the radiator 110 installed in a vehicle with the head portion 116H of radiator support post 116P supported in the cap portion 140C of mount 140.

As described above, the cylindrical portion 116TC of the support post 116P has a tapped bore arranged to receive fixing element 150F. In the embodiment shown the fixing element 150F is a bolt. The fixing element 150F is screwed into the post 116P from below the chassis support 105S. A head 150FH of the fixing element 150F is spaced apart from the chassis support 105S by a resiliently deformable bush 150B formed from an elastomeric material. The bush 150B is arranged to be lightly compressed by washer element 150W when the fixing element 150F is correctly tightened. The arrangement allows resilient movement of the support post 116P in a vertical direction and a horizontal plane with respect to the chassis support 105B.

The radiator 110 has a rearward projecting support structure 110SR attached thereto supporting a number of components including a fan cowl to which a fan is attached, a thermostat, an oil cooler and other ancillary components. A forward projecting support structure 110SF supports a condenser and optionally a condenser fan. It is to be understood that front to rear loads on the radiator 110 associated with the forward and rearward structures 110SR, 110SF due to external inputs such as bumps in a driving surface or internal vibratory modes associated with vehicle operation act along a line that passes through or close to a vertical position of the joint between the tubes 112 and lower coolant tank 114L. Thus a magnitude of a moment about the joint is substantially less than that which would be experienced in the prior art arrangement of FIG. 1.

Figure 6:
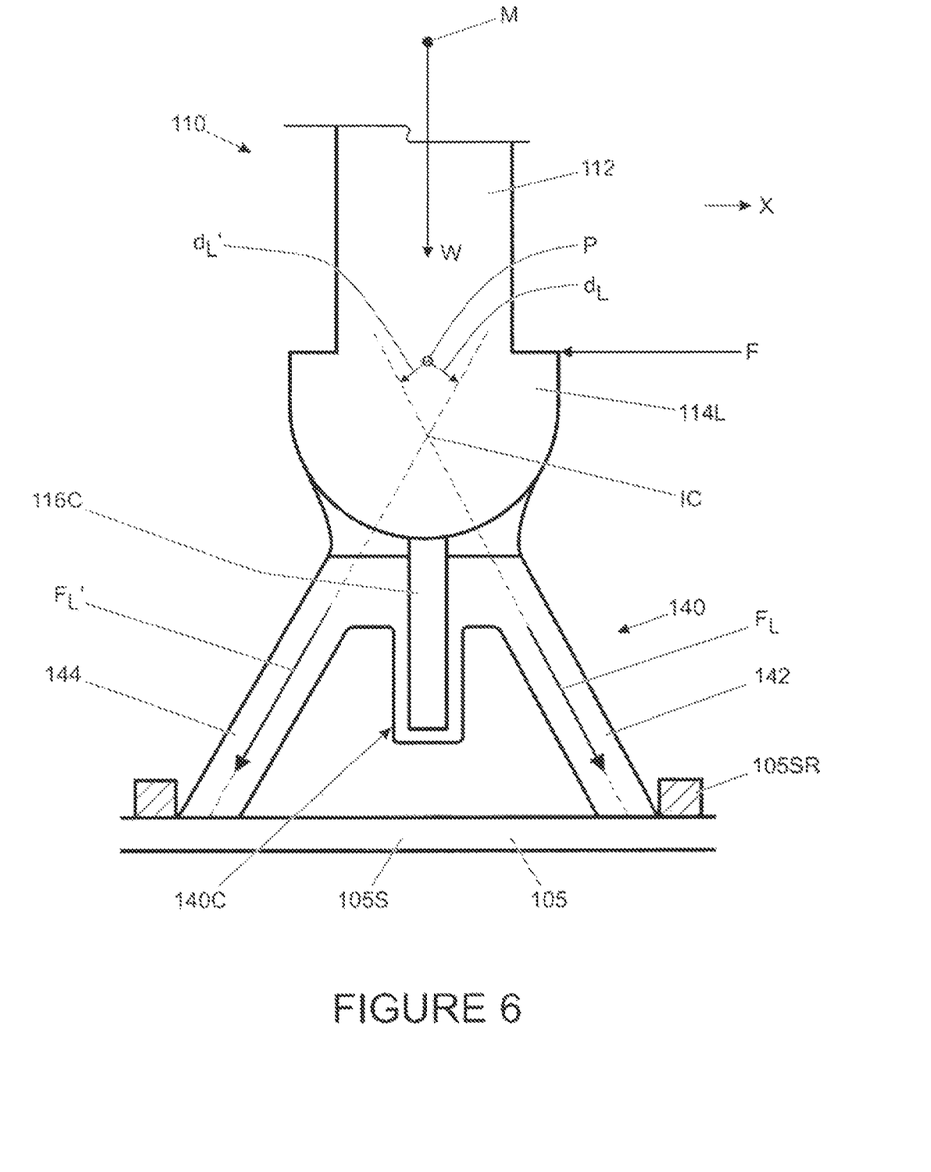
FIG. 6 is a schematic illustration of a portion of the mount of FIG. 2 in cross section showing some of the forces associated with support of a radiator.

We now consider in more detail the role of legs 142, 144 in supporting the radiator 110. FIG. 6 shows a lower portion of the radiator 110 supported on a mount 140 as viewed in cross-section showing one pair of legs 142, 144 only. It can be seen that as described above, the legs 142, 144 grip lateral blade 116C of the head portion 116H.

In the example shown, the radiator 110 is being subjected to a horizontal force F parallel to a longitudinal axis of the vehicle and orthogonal to a plane of the radiator 110, which plane is normal to the plane of the page. The force F is applied at a vertical position corresponding to that of the joint between radiator tubes 12 and lower coolant tank 114L.

The legs 142, 144 support the weight W of the radiator 110 which places an initial compression on each leg 142, 144. In addition, the legs 142, 144 transmit the force F applied to the radiator to the support platform 105S. The rearward leg 144 is subjected to increased compression due to force F (in addition to a component of weight W) whilst the forward leg 142 is subject to decreased compression (a portion of force F is directed so as to subject the forward leg 142 to a tensile force, decreasing the net compressive force on the forward leg 142). The rearward projecting leg 144 transmits a net force F'L to the support platform 105S whilst the forward projecting leg transmits a net force FL to the support platform 105S.

It is to be understood that reaction forces are developed by toe support platform 105S to counter the force F. The legs are arranged wherein forces FL, F'L intersect at an instantaneous (virtual) centre IC above the mount 140. In the embodiment shown the instantaneous centre IC is located within the radiator 110 itself. In particular, in the embodiment shown the instantaneous centre IC is located within lower fluid tank 114L. Other locations for the instantaneous centre IC are also useful.

It is to be understood that because the reaction by the support platform 105S to force F acts through an instantaneous centre IC above the mount 140 (where, by definition, no bending moment is experienced), the magnitude of the bending moment to which the radiator 110 is subject in that region may be decreased. In particular, the magnitude of the bending moment to which the radiator 110 is subject at the location of a relatively weak joint between lower coolant tank 114L and tubes 112 may be substantially reduced.

This has the effect of seducing a risk of damage to the radiator 110 in the event the radiator 110 is subject to impact forces. In some radiator structures, one or more support platforms may be arranged to project forwardly of the radiator 110 in the vicinity of the joint between the lower coolant tank 114L and tubes 112. The support platform(s) may be arranged to support one or more condensers, cooling fans or other ancillary components. In the event of a collision with an obstacle as the vehicle moves forward, impact forces may act upon the radiator 110 in the direction of force F. Embodiments of the invention have the advantage that, in the event this occurs, the radiator 110 experiences a reduced bending moment at the joint between the lower coolant tank 114L and tubes 112 compared with that which would be experienced under similar circumstances by the prior art arrangement of FIG. 1.

It is to be understood that known radiators 10 are typically supported by two radiator support posts 20 at opposite ends of the radiator 110. It is to be understood that in some situations assembly operatives may experience difficulty installing some radiators in a vehicle due to differences in spacing between the support posts 20 as a consequence of manufacturing variations or tolerances. In order to overcome this problem, in an embodiment of the present invention the radiator support posts 20 of a given radiator have different respective shapes in order to accommodate misalignment between the posts and mounts 140. In an embodiment one of the posts is arranged such that a head portion thereof fits within the cap portion 140C of the mount 140 with little or no tolerance for lateral misalignment of the post with respect to the mount 140, and to be gripped snugly by the cap portion 140C when the mount 140 bears the weight of the radiator 110. As described above, when a head portion of the post is placed in the cap portion 140C and pressure is applied thereto, the elastomeric material of the mount 140 is placed under compressive stress, causing the cap portion 140C to expand to grip the head portion of the post.

The other post is arranged to fit within the cap portion 140C of the corresponding mount 140 provided the post is located within a range of lateral positions with respect to the mount 140, and to be gripped snugly by the cap portion 140C when the mount 140 bears the weight of the radiator 110. This feature has the advantage that when the radiator 110 is being installed in the vehicle, differences in the distance between the centres of respective radiator support posts and the distance between the mounts 140 may be accommodated. Thus, whilst one radiator support post locates snugly with little tolerance for lateral misalignment, the other support post may locate snugly over a range of lateral positions. Thus, a risk that a radiator is unable to be fitted into a vehicle or that excessive stress is placed on a radiator in order to force the support posts to fit into their respective mounts may be eliminated.

Figure 7:
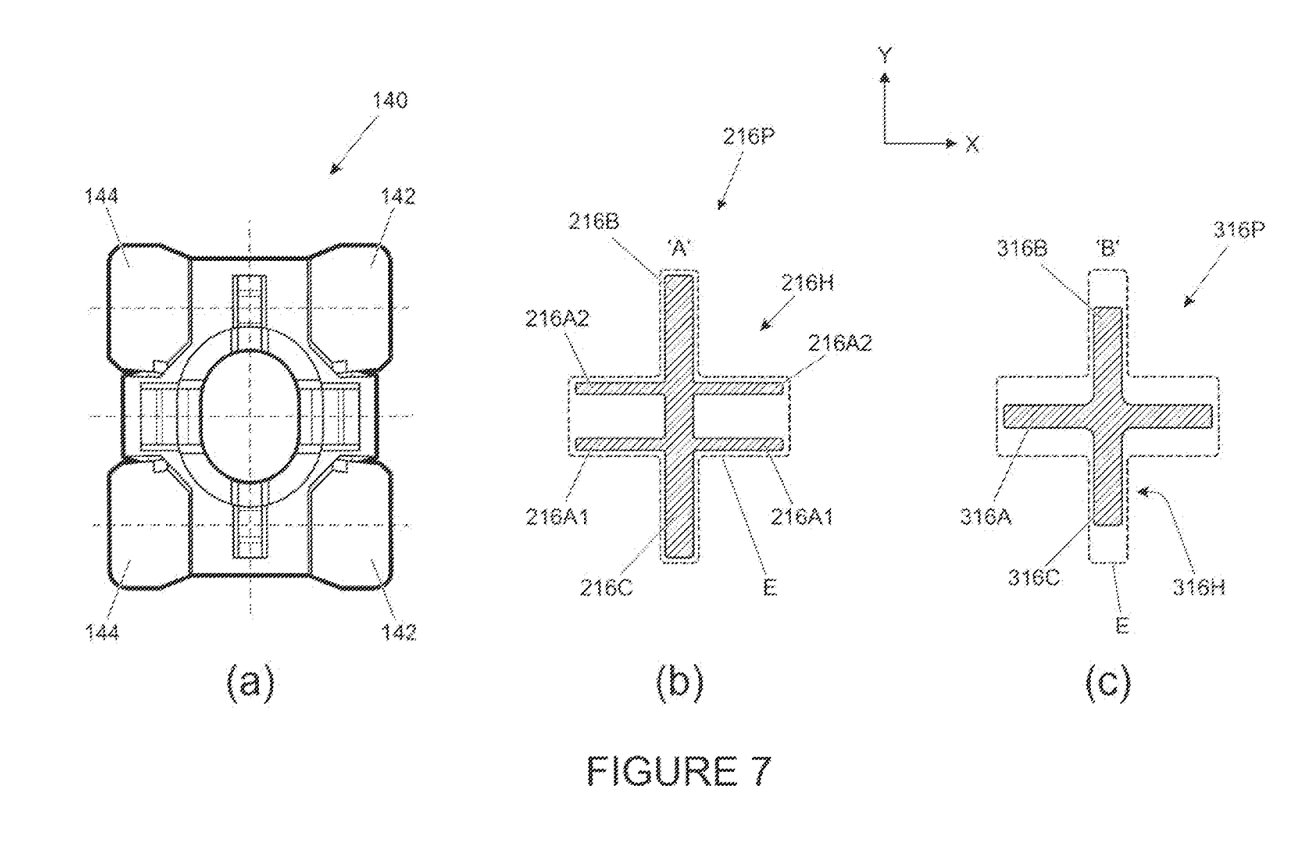
FIG. 7 shows (a) a plan view of the mount of FIG. 2, (b) a plan view of a type A head portion of a support post according to an embodiment of the invention and (c) a plan view of a type B head portion of a support post according to an embodiment of the invention.
Figure 8:
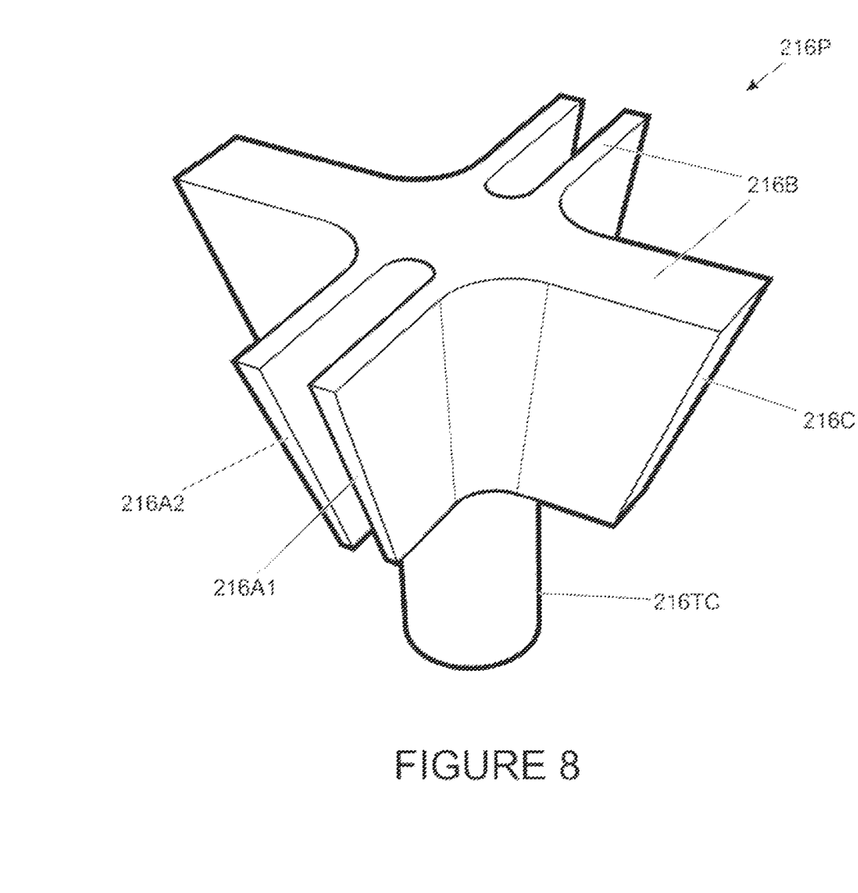
FIG. 8 is a perspective view of the type A head portion of FIG. 7(b).

FIG. 7 shows (a) the mount portion 140 of FIG. 2 in plan view, (b) a type TV radiator support post 216P according to an embodiment of the invention and (c) a type 'B' radiator support post 316P according to an embodiment of the invention. Like features of the posts of FIGS. 7(b) and (c) to those of the embodiment of FIG. 4 are shown with like reference signs prefixed numerals 2 and 3 respectively instead of numeral 1.

The type 'A' radiator support post 216P is arranged to fit within the cap portion 140C with a snug fit between surfaces of the head portion 216H and cap portion 140C. As in the case of the post 116P of FIG. 4, when the head portion 216H is lowered into the cap portion 140C of the mount 140, the head portion 216 is self-centering, the process of self-centering being made particularly convenient by virtue of the fact that the blades 216A1, 216A2, 216C are tapered to a tip. However, in the embodiment of FIG. 4 where both support posts 116P of a given radiator 110 are identical, there is substantially no tolerance for a deviation in lateral spacing of the posts 116P from that of the mounts 140.

In contrast, the type 'B' radiator support post 316P is arranged to fit within the cap portion 140C and to be capable of accommodating a prescribed amount of misalignment of the posts 216P, 316P along lateral axis Y.

As shown in FIG. 7(b), the type A post 216P has a transverse blade 216C having a similar shape and size to the corresponding transverse blade 116C of the post 116P of FIG. 4. The blade 216C has a thickness corresponding to a width of the cavity defined by the cap portion 140C that is located between respective pairs of forward and rearward projecting legs 142, 144. As in the embodiment of FIG. 4, the lateral extent of the blade 116C sized such that when the post 216P is inserted into the cap portion 140C the blade fits snugly into the cap portion 140C with substantially no gap between the blade 216C and cap portion 140C in either a lateral or longitudinal direction.

The post 216P has two longitudinal blades 216A1, 216A2 aligned parallel to the X axis. The blades 216A1, 216A2 are each of a lower thickness than corresponding longitudinal blade 116A of the embodiment of FIG. 4 but are spaced apart in a lateral direction with a gap therebetween. The blades 216A1, 216A2 effectively define a single blade of thickness corresponding to that of the blade 116A of FIG. 4. In some embodiments the post 116P of FIG. 4 may be substituted for the post 216P of FIG. 7(b) and employed in a radiator together with the post 316P of FIG. 7(c).

The post 316P of FIG. 7(c) also has a lateral blade 316C and a longitudinal blade 316A. The lateral blade 316C has a thickness similar to that of blades 216C, 116C but has a reduced lateral extent. This is so as to allow a location of the post 316P with respect to the mount 140 to vary in the lateral direction within a prescribed range of positions whilst still allowing the mount 140 to grip the blade 316C when the head portion 316H of the post 316 is inserted into the cap portion 140C of the mount 140.

In order to allow the tolerance in lateral position of the post 316P to be enjoyed, the thickness of longitudinal blade 316A is reduced but the longitudinal extent remains substantially the same as that of blades 216A1, 216A2 and 116A.

Thus, the thickness of longitudinal blade 316A is arranged to be less than that of the portion of the cavity defined by the cap portion 140C that is located between respective forward projecting legs 142 and between respective rearward projecting legs 144 by an amount corresponding to the required tolerance.

It is to be understood that, because the longitudinal extent of longitudinal blade 316A remains unchanged, vertical movement of the post 316P in a downwards direction towards the support platform 105S is still limited by forward and rearward bump-stop elements 105B. Thus, the benefit of the bump-stop elements 105B may still be enjoyed, with the advantage of improved tolerance in respect of variations in the distance between posts 216P, 316P of a given example of a radiator.

As described above, because of the feature of tapered blades 116A, 116C, 216A, 216B, 316A, 316C the support posts 116P, 216P, 316P effectively automatically align along a longitudinal axis as the head portions 116H, 216H, 316H are inserted into the cap portion 140C of the mount 140.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A mount for supporting a motor vehicle radiator, the mount comprising resiliently flexible coupling means for coupling the mount to a support portion of the radiator, the coupling means comprising a pair of opposed grip members for gripping the support portion, the mount comprising a pair of leg portions, the leg portions being arranged to urge the grip members towards one another when the support portion is urged against the mount,
the mount being configured wherein when the support portion of the radiator is placed between the grip members and the support portion is urged against the mount, the grip members exert a gripping force on the support portion to retain the support portion therebetween.

2. A mount as claimed in claim 1 wherein a first slot is provided between the pair of leg portions to receive a corresponding first member of the radiator support portion.

3. A mount as claimed in claim 1 comprising two pairs of the leg portions arranged in box formation.

4. A mount as claimed in claim 2 further comprising a second pair of leg portions and a second slot between the second pair of leg portions for receiving a corresponding second member of the radiator support portion.

5. A mount as claimed in claim 4 wherein the first and second slots are substantially orthogonal to one another.

6. A mount as claimed in claim 4 wherein a length of one or both of the first and second slots is tapered in a direction along which the mount is arranged to allow the radiator support portion to be introduced therein.

7. A motor vehicle body structure comprising a radiator mount support platform arranged to support a mount as claimed in claim 1.

8. A structure as claimed in claim 7 comprising:
a pair of radiator mount support platforms each supporting a respective mount; and
a radiator having a pair of radiator support portions,
wherein each of the radiator support portions is gripped by a corresponding mount whereby the radiator is supported by the vehicle body structure.

9. A structure as claimed in claim 8 wherein the pair of radiator support portions each comprise first and second orthogonal members shaped in a complementary manner to the first and second slots of the mount.

10. A method of supporting a motor vehicle radiator, the method comprising coupling a support portion of the radiator to a mount comprising resiliently flexible coupling means, whereby when the radiator is placed between a pair of opposed grip members of the coupling means and the support portion is urged against the mount, the grip members exert a gripping force on the support portion to retain the support portion therebetween, wherein the mount comprises a pair of leg portions, the leg portions being arranged to urge the grip members towards one another when the support portion is urged against the mount.

11. A method of assembly of a radiator support structure comprising providing a pair of mounts as claimed in claim 1; and coupling each one of a pair of radiator support portions of a radiator to a respective one of the mounts.

12. A method as claimed in claim 11 comprising providing the pair of mounts on support portions of a motor vehicle structure.

13. A mount for supporting a motor vehicle radiator comprising:
coupling means for coupling the mount to a support portion of the radiator; and
a first pair of support leg portions for supporting the mount on a surface, first and second support leg portions of the first pair being arranged to define two sides of a triangular structure,
the mount being arranged such that in use an apex defined by the leg portions is spaced apart from the surface by the leg portions.

14. A mount as claimed in claim 13 wherein the support leg portions define two sides of a truncated triangular structure having a virtual apex.

15. A mount as claimed in claim 14 wherein the virtual apex is arranged in use to be located within the radiator, optionally within a support portion of the radiator.

16. A motor vehicle body structure comprising a radiator mount support platform arranged to support a mount as claimed in claim 13.

17. A structure as claimed in claim 16 wherein the support platform comprises at least one pair of bump-stop elements arranged to abut an outer surface of the cap portion on opposite sides of the mount in the event the cap portion is displaced a sufficient distance towards one of the bump-stop elements.

18. A structure as claimed in claim 17 wherein the bump-stop elements have a surface in opposition to the cap portion that is inclined with respect to a plane containing lateral and longitudinal axes of the vehicle thereby to direct a reaction force between a bump-stop element and the cap portion into the radiator support portion such that the reaction force has components that are parallel and perpendicular to a z-axis of the vehicle being an axis normal to the plane containing the lateral and longitudinal axes of the vehicle.

19. A method of supporting a radiator of a motor vehicle comprising transmitting forces acting on the radiator to a body structure of the vehicle by means of a mount, whereby forces acting on the radiator along lateral or longitudinal axes of the vehicle are transmitted through support leg portions of the mount defining a substantially triangular structure and act through an instantaneous centre at an apex thereof, the apex being spaced apart from the vehicle body structure by the leg portions when in use.

\* \* \* \* \*